(12) United States Patent
Xu et al.

(10) Patent No.: US 8,463,121 B2
(45) Date of Patent: Jun. 11, 2013

(54) ULTRA WIDE-RANGE FREQUENCY OFFSET ESTIMATION FOR DIGITAL COHERENT OPTICAL RECEIVERS

(75) Inventors: Lei Xu, Princeton Junction, NJ (US); Shaoliang Zhang, Anhui Province (CN); Jianjun Yu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 436 days.

(21) Appl. No.: 12/902,801

(22) Filed: Oct. 12, 2010

(65) Prior Publication Data

US 2011/0085797 A1   Apr. 14, 2011

Related U.S. Application Data (60) Provisional application No. 61/250,297, filed on Oct. 9, 2009.

(51) Int. Cl.
*H04B 10/08* (2006.01)
*H04B 10/06* (2006.01)

(52) U.S. Cl.
USPC ............ 398/27; 398/202; 398/208; 398/214; 398/209

(58) Field of Classification Search
USPC ....................................................... 398/208
See application file for complete search history.

(56) References Cited

U.S. PATENT DOCUMENTS

| 5,150,380 | A * | 9/1992 | Okanoue ....................... 375/236 |
| 7,606,498 | B1 * | 10/2009 | Wu et al. ....................... 398/152 |
| 2002/0094052 | A1 * | 7/2002 | Staszewski et al. ........... 375/376 |
| 2007/0092260 | A1 * | 4/2007 | Bontu et al. ................... 398/152 |
| 2007/0206963 | A1 * | 9/2007 | Koc ............................... 398/202 |
| 2008/0152361 | A1 * | 6/2008 | Chen et al. .................... 398/205 |
| 2009/0214201 | A1 * | 8/2009 | Oda et al. ........................ 398/25 |
| 2010/0028011 | A1 * | 2/2010 | Kaneda et al. ................ 398/115 |
| 2010/0080564 | A1 * | 4/2010 | Fujii ............................. 398/115 |
| 2010/0138722 | A1 * | 6/2010 | Harley et al. ................. 714/762 |
| 2010/0329677 | A1 * | 12/2010 | Kaneda et al. ................. 398/65 |

OTHER PUBLICATIONS

Gardner, F.M., "A BPSK/QPSK Timing-Error Detector for Sampled Receivers", IEEE Transactions on Communications, vol. Com-34, No. 5, May 1986, pp. 423-429.

Wang, Y. et al., "Non-Data Aided Feedforward Estimation of PSK-Modulated Carrier Frequency Offset", Optical Fiber Communication (OFC), collocated National Fiber Optic Engineers Conference, 2010 Conference on (OFC/NFOEC), Mar. 21-25, 2010, 5 pages.

* cited by examiner

*Primary Examiner* — Kenneth N Vanderpuye
*Assistant Examiner* — Abbas H Alagheband
(74) *Attorney, Agent, or Firm* — James Bitetto; Joseph Kolodka (57) ABSTRACT

Methods and systems for receiving an optical signal using cascaded frequency offset estimation. Coherently detecting an optical signal includes compensating for a coarse laser frequency offset between a transmitting laser and a local oscillator laser by determining a maximum phase error (MPE) in the optical signal, compensating for a residual laser frequency offset between the transmitting laser and the local oscillator laser, and decoding data stored in the optical signal.

20 Claims, 6 Drawing Sheets

ULTRA WIDE-RANGE FREQUENCY OFFSET ESTIMATION FOR DIGITAL COHERENT OPTICAL RECEIVERS

RELATED APPLICATION INFORMATION

This application claims priority to provisional application Ser. No. 61/250,297, filed on Oct. 9, 2009, incorporated herein by reference.

BACKGROUND

1. Technical Field

The present invention relates to coherent optical detection and, in particular, to methods and systems for frequency offset estimation in coherent detection that is effective over a wide range.

2. Description of the Related Art

With the recent advance of high-speed analog-to-digital converters (ADC) and digital signal processing circuits, coherent detection has attracted strong interest because such a scheme, in conjunction with advanced modulation formats, can offer higher spectrum-efficiency and better receiver sensitivity over direct detection. In coherent receivers, received electric field information can be retained to allow digital signal processing (DSP) techniques to cope with the transmission impairments of a system. One key DSP function is to recover the carrier phase using DSP-based phase estimation (PE) rather than optical phase-locked loops, thus allowing for a free-running local oscillator (LO) laser. Some popular phase estimation algorithms require that the frequency offset between transmitter and LO laser be quite small compared to symbol rate, such that both lasers operate at nearly the same frequency. These PE algorithms fail to work when the frequency offset is larger than 1 GHz in a 10 Gsymbol/s coherent system using dual-polarization quadrature phase shift keying (QPSK) modulation format, resulting in a failure to match frequencies beyond this range. Commercial tunable lasers, however, have end-of-life frequency accuracy of about ±2.5 GHz. In other words, the frequency offset between transmitter and LO lasers can be as large as ±5 GHz, resulting in equipment failure when the frequency offset exceeds the relatively small range of conventional PE algorithms.

SUMMARY

A method for receiving an optical signal is shown that includes coherently detecting an optical signal and decoding data stored in the optical signal. The coherent detection further includes compensating for a coarse laser frequency offset between a transmitting laser and a local oscillator laser by determining a maximum phase error (MPE) in the optical signal and compensating for a residual laser frequency offset between the transmitting laser and the local oscillator laser.

A receiver is shown that includes a coherent detector configured to detect an optical signal and a digital signal processor configured to decode data stored in the optical signal. The digital signal processor further includes a coarse frequency offset estimator (FOE) configured to compensate for a coarse laser frequency offset between a transmitting laser and a local oscillator laser by determining a maximum phase error (MPE) in the optical signal and a fine FOE configured to compensate for a residual laser frequency offset between the transmitting laser and the local oscillator laser.

A method for receiving an optical signal is shown that includes coherently detecting an optical signal and decoding data stored in the optical signal. Said coherent detection includes compensating for a coarse laser frequency offset between a transmitting laser and a local oscillator laser and compensating for a residual laser frequency offset between the transmitting laser and the local oscillator. Compensating for a coarse laser frequency offset includes determining a maximum phase error (MPE) in the optical signal by sweeping a timing offset, converting the MPE to a coarse derotation value by comparing the MPE to a lookup table, and derotating the signal using the coarse derotation value. Compensating for a residual laser frequency offset includes determining a fine derotation value and derotating the optical signal using the fine derotation value These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In light of the wide range of possible frequency offsets that may occur between two lasers in a coherent reception system, a new digital signal processing (DSP) based frequency offset estimator (FOE) is provided by the present principles to ensure that phase estimation (PE) accurately recovers the phase of received signals.

It is desirable that the FOEs should have a wide operating range with accurate estimation, a feed-forward structure and low computational complexity. In FOEs which use an $M^{th}$-power method to remove data modulation, the maximal estimation range is limited to $[-R_s/2M, R_s/2M]$, where $R_s$ refers to the system symbol rate and M is the number of constellation states of the modulated signal. An FOE for an intradyne receiver can only tolerate a maximum frequency offset of ~1.25 GHz at 10 Gsymbol/s in quadrature phase shift keying (QPSK) modulation. In contrast, the present principles provide a novel dual-stage, cascaded FOE consisting of a coarse FOE and a fine FOE. The estimation range provided by the present dual-stage cascaded FOE can be up to ±9 GHz according simulation results and ±5.4 GHz in a 43 Gbit/s coherent polarization-multiplexing (PolMux) return-to-zero (RZ-) QPSK system having a system symbol rate of 10.75 GSymbol/s. Thus, the working range of FOEs can advantageously be up to ±0.5 R. This can be implemented without any feedback or training data requirement, resulting in a system that is much simpler and cheaper to arrange than direct detection methods.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
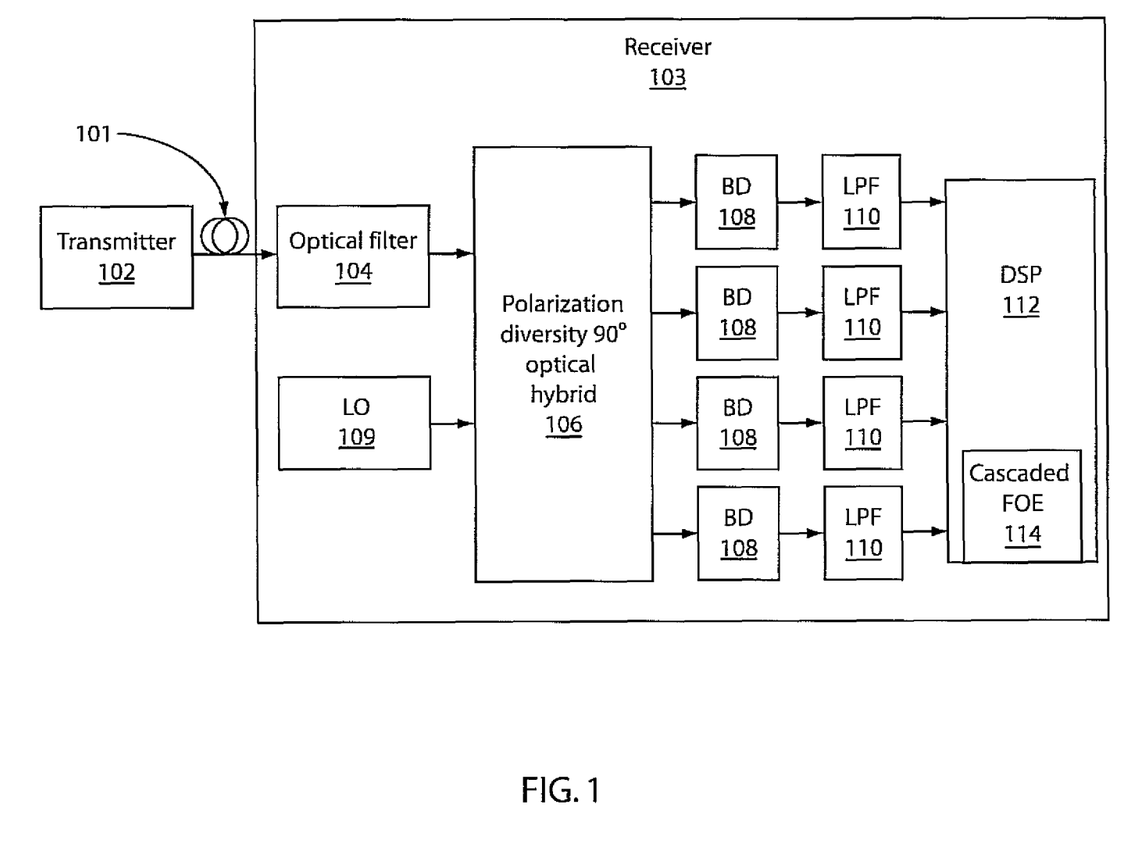
FIG. 1 is a diagram of a receiver that performs coherent detection according to the present principles.

Referring now to the drawings in which like numerals represent the same or similar elements and initially to FIG. 1, an optical transmission system is shown that uses coherent detection. A PolMux RZ-QPSK transmitter 102 sends optical signals along a fiber 101. The signals suffer amplified spontaneous emission noise before they reach coherent polarization-diversity receiver 103, so a second order Gaussian optical filter 104 is used to filter the noise out. The filtered signals pass to a polarization diversity 90° optical hybrid 106 which, using local oscillator (LO) laser 109, produces four output signals that may be used to recover the transmitted data. Each signal is converted from the optical domain to the electrical domain using a balanced detector (BD) 108 before passing through a $5^{th}$-order Bessel electrical low-pass filter 110 having bandwidths at 75% of the symbol rate. The effect number of bits for analog/digital converters (ADCs) is 8 in one exemplary coherent polarization-diversity receiver 103. The filtered signals are then processed by a DSP processor 112 which compensates for signal distortions that occur during optical fiber transmissions and extracts the original data. The DSP processor 112 includes a cascaded FOE 114 which determines and compensates for a wide range of frequency offsets between the transmitter 102 and the LO 108.

Timing recovery, using methods such as square timing recovery and the Gardner formulation, is usually required to correct the timing phase error between the transmitter 102 and receiver 103 clocks in coherent receivers. The simple Gardner formulation can be used to generate a phase error output when only two samples per symbol are available. As a comparison, square timing recovery requires at least 4 times oversampling to ensure proper performance. In a coherent PolMux phase-shift keying (PSK) system with a Nyquist sampling rate (2 samples per symbol), the Gardner formulation can be mathematically represented by $$U_t(2k)=I_x(2k-1)[I_x(2k)-I_x(2k-2)]+Q_x(2k-1)[Q_x(2k)-Q_x(2k-2)], \quad (1)$$

where $I_x$ and $Q_x$ are samples in in-phase and quadrature branches for X-polarization state, respectively. Here, $U_t(2k)$ is the phase error output of the Gardner formulation corresponding to the current sampling point, 2k. The factor of 2 in the argument indicates that there will be twice as many samples as symbols. A timing offset is represented by an analog-to-digital conversion (ADC) control clock. The I and Q signals in equation (1) are the signal samples after ADC.

The S-curves produced by equation (1) represent the open-loop relationship between sampling timing offset and the estimated phase error in the system. However, the performance of the Gardner formulation suffers from degradation resulting from the frequency offset between the transmitter 102 and LO lasers 108. While this may be undesirable for the purpose of timing recovery, the present principles advantageously make use of the degradation in FOE, utilizing the maximum phase error (MPE) outputs of the Gardner formulation as a measure to estimate frequency offset in a coherent optical system. Because the MPE of the Gardner formulation varies in a very predictable way with the frequency offset, finding the MPE allows for rapid determination of the frequency offset. The MPE is the highest phase error produced at a given frequency across the tested timing offsets.

Figure 2:
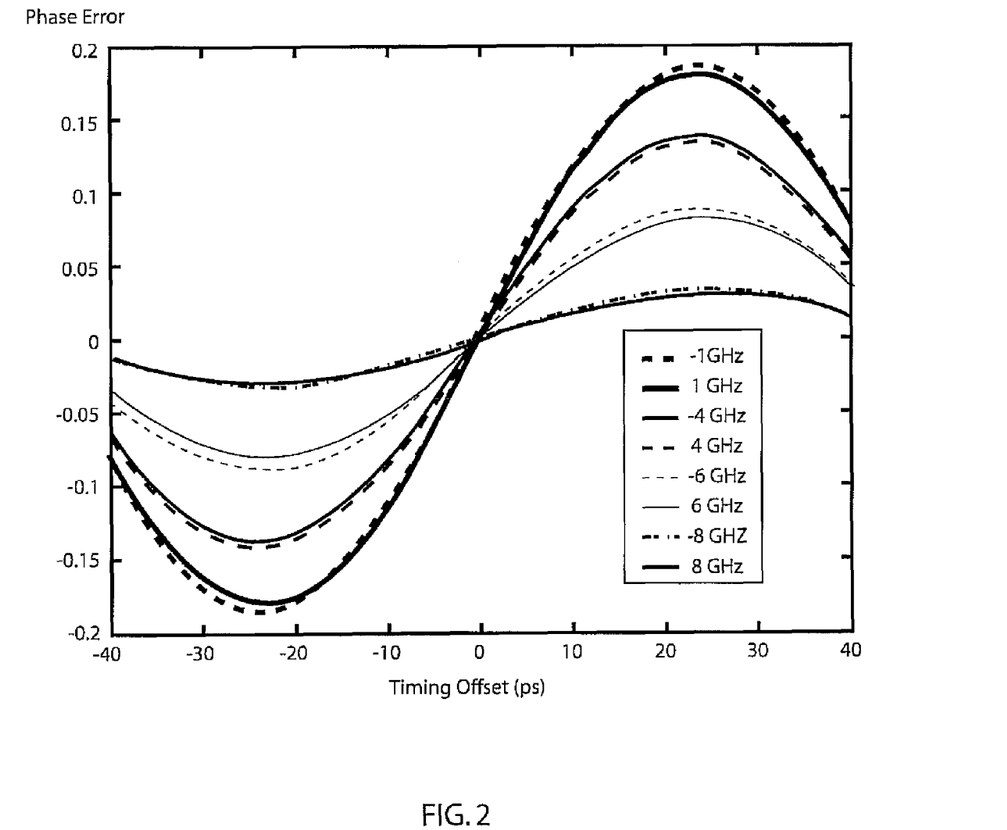
FIG. 2 is a graph showing the relationship between phase error and frequency offset.

Referring now to FIG. 2, a series of S-curves is shown, obtained by sweeping the sampling timing offset and tuning the frequency offset. In order to sweep the timing offset, the received I and Q signal samples, measured at two samples per symbol, are up-sampled by the DSP 112. Different timing offsets can then be introduced. The upsampling rate is decided by the hardware resource—with a larger upsampling rate, better accuracy in the MPE can be achieved. It can be observed that the S-curve becomes more flat as frequency offset increases. In other words, the S-curve becomes less sensitive to the sampling offset. Thus, the presence of a large frequency offset deteriorates the effectiveness of the Gardner formulation when it is used as a timing recovery mechanism in coherent receivers. On the other hand, the underlying relationship between the frequency offset and MPE of the Gardner formulation is easy to determine and provides an effective way to estimate frequency offsets that exist in the system by measuring the MPE—a set of correspondences may advantageously be established in advance and stored in a lookup table (LUT) to allow a receiver to efficiently find an offset value.

Figure 3:
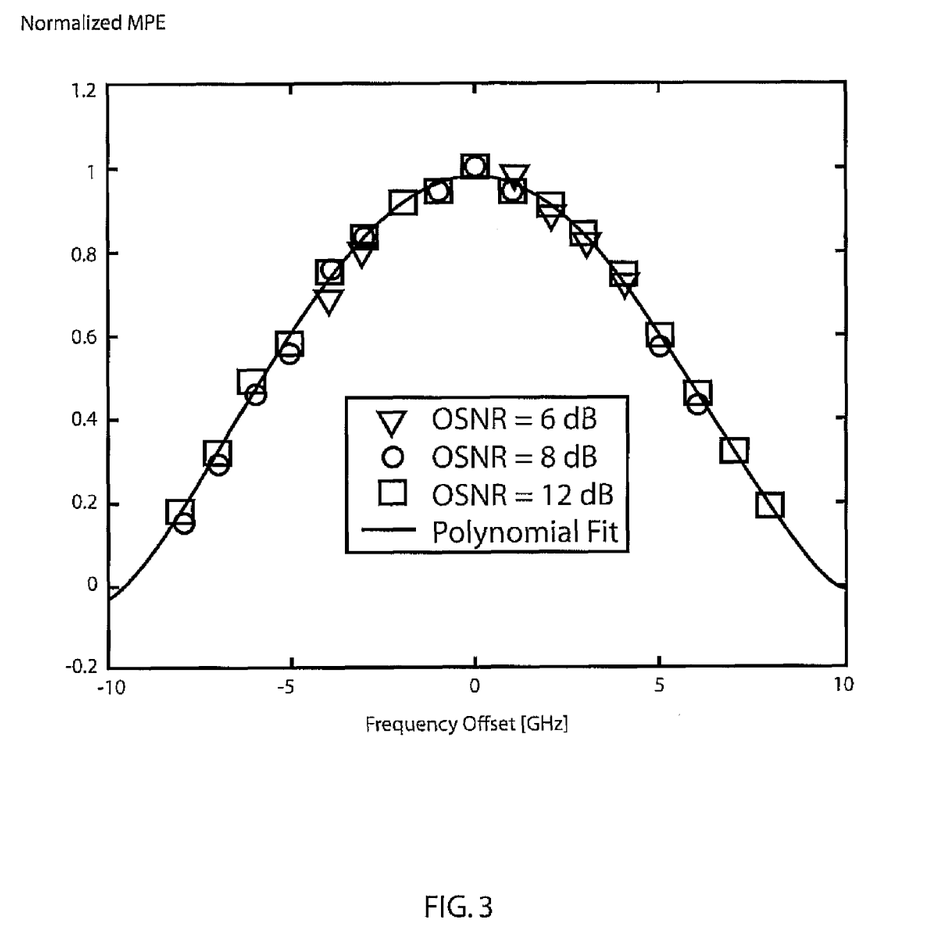
FIG. 3 is a graph showing the relationship between maximum phase error and frequency offset.

Referring now to FIG. 3, the normalized MPE output from the Gardner formulation is plotted against different frequency offsets. Note that the absolute value of the MPE varies with different optical signal-to-noise ratio (OSNR) values, such that the raw graphs are not comparable. Therefore, the MPE is normalized to the value at zero frequency offset, allowing for comparison between the patterns at different OSNRs. As illustrated in FIG. 3, the normalized MPEs under different OSNRs exhibit almost the same trend. A $4^{th}$-order polynomial models the trend between the normalized MPE and frequency offset very well, illustrating the very predictable relationship between MPE and frequency offset. It is worth mentioning that the polynomial fit can only offer a coarse estimation of frequency offset ($\Delta\hat{f}_c$), leaving the residual offset to be compensated for by other means.

In simulations, the estimation error range of $\Delta \hat{f}_c$ was found to be limited to a range of [−1 GHz, 1 GHz] around the true value. By sweeping the sampling offset, the MPE obtained in Gardner formulation is normalized to estimate a coarse frequency offset ($\Delta \hat{f}_c$) while the residual frequency offset can be accurately estimated through conventional fast Fourier transform (FFT) FOE ($\Delta \hat{f}_f$), such as the Mth-power formulation referred to above. By combining both of these estimation and compensation techniques, the entire frequency offset may be determined and corrected over a very wide range. It should be noted that the FFT FOE is used herein for the sake of example and should not be construed as limiting.

Figure 4:
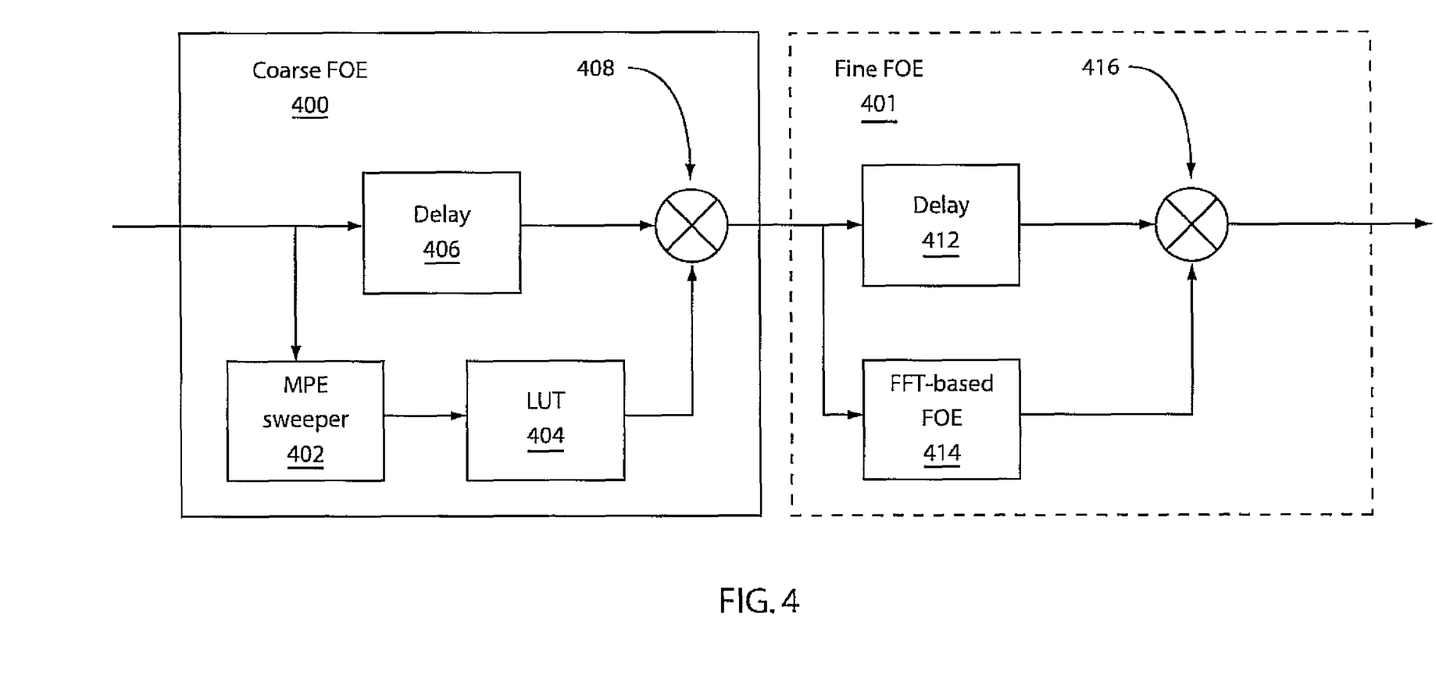
FIG. 4 is a diagram showing a cascaded frequency offset estimator.

To deal with the residual frequency offset, a conventional fast Fourier transform (FFT)-based FOE is cascaded with a coarse FOE utilizing the normalized MPE method. Referring now to FIG. 4, a cascaded FOE is shown. Signals pass first to a coarse FOE 400 which corrects the frequency offset to within a broad range. The signals then pass through a fine FOE 401 having a narrower operational range than the coarse FOE 400, which corrects the remaining frequency offset. To accomplish this, the coarse FOE 400 receives a signal and processes the signal with an MPE sweeper 402 as described above. The MPE sweeper 402 finds phase error by sweeping the timing offset of the incoming signal. This produces an S-curve, such as those shown in FIG. 2. The maximum of the S-curve is then found and the results are normalized to produce an MPE. A lookup table (LUT) 404 is used to convert the output of the MPE sweeper 402 into a frequency change value, an operation which is possible because of the predictable relationship between the MPE produced by the Gardner formulation and the frequency offset that is shown in FIG. 3. Another copy of the signal is delayed at block 406 and then multiplied by the frequency change value and multiplier 408. The coarsely compensated signal then passes to fine FOE 401 which uses an FFT-based FOE to produce a fine frequency change value. Multiplier takes a delayed signal from block 412 and multiplies it by the fine frequency change value to produce a fully compensated signal.

Since the conventional FOE 401 uses Mth-power operation, the range of estimated frequency offset ($\Delta \hat{f}_f$) is limited into [−$R_s$/2M, $R_s$/2M]. In one exemplary embodiment, M=4 and $R_s$=10.7 GBaud, i.e., the maximum range for the fine FOE 101 is ±1.34 GHz. The coarse FOE 100 is capable of enlarging the restricted range of the conventional FOE because of the well-behaved characteristics between frequency offset and MPE, as shown above in FIG. 3. Because the coarse FOE is accurate to within, e.g., ±1 GHz, the range of the fine FOE can accommodate any residual frequency offset that the coarse FOE does not address.

Although the Gardner formulation and the Mth-power formulation are shown herein for the purpose of example, any methods for producing a coarse FOE over a broad range of offsets and a fine FOE over a relatively narrow range of offsets may be used in the cascaded fashion described herein as long as the residual offset left over by the coarse FOE falls within the range of the fine FOE.

One problem is that the normalized MPE would find two different frequency offsets with opposite sign, representing the respective minimum and maximum of the S-curves as indicated in FIG. 3. This is can be addressed by pre-defining the sign according to the specified wavelength of the transmitter and LO lasers or by using a feedback bit error to determine the sign.

Figure 5:
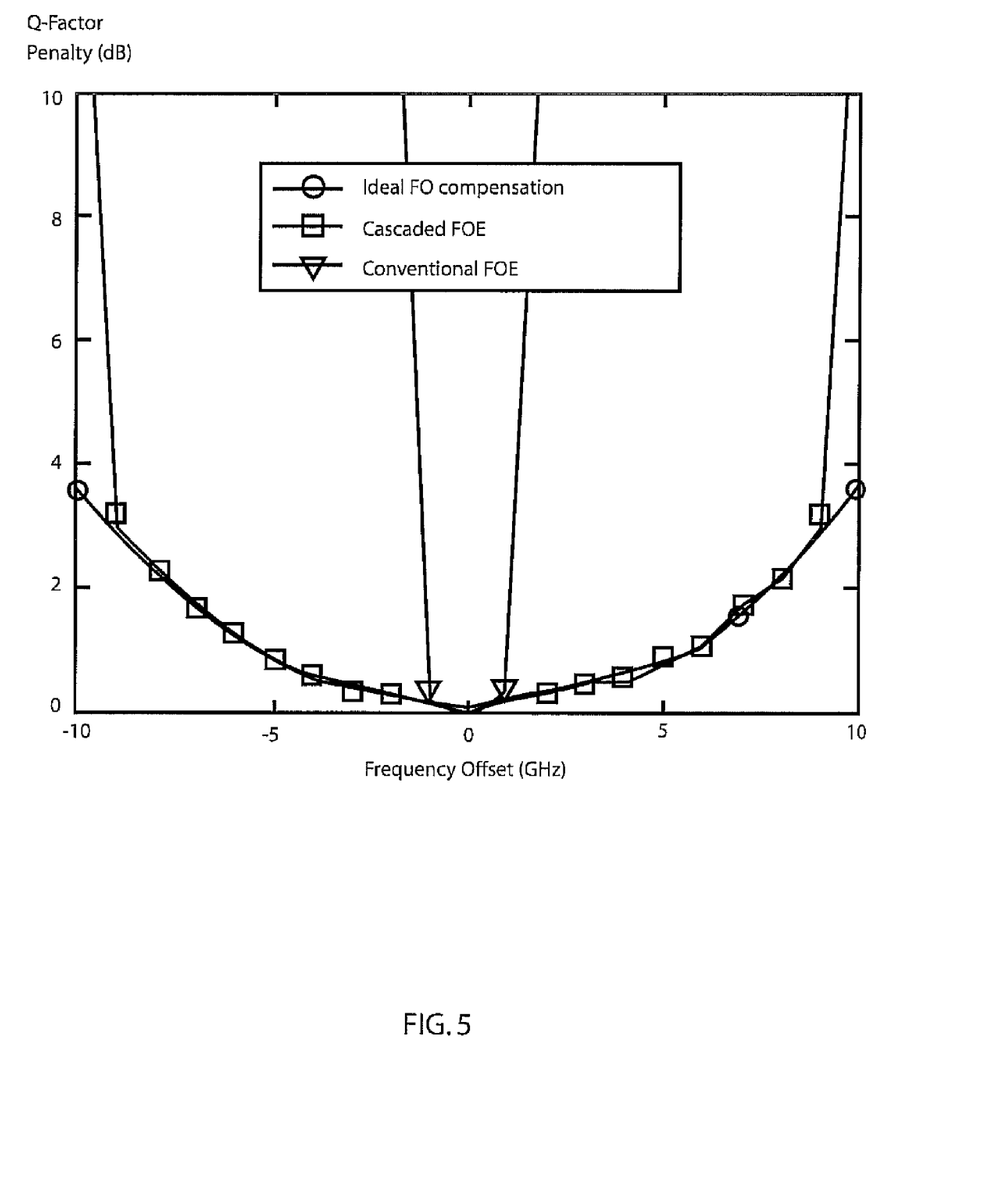
FIG. 5 is a graph showing the effect on Q-factor penalty for a cascaded frequency offset estimator versus a conventional frequency offset estimator.

Referring now to FIG. 5, the Q-factor penalty is plotted versus different frequency offsets in the simulated PolMux RZ-QPSK system at an OSNR of 9 dB. The Q-factor describes the responsiveness of the system, where a Q-factor penalty represents an effective decrease in the strength of the received signal. Bit error rate (BER) is calculated using the Monte Carlo method with more than 100 errors counted, and the penalty reference is the Q-factor at zero frequency offset. To compare the performance of the cascaded FOE, FIG. 5 also includes the performance of using only FFT-based FOE, i.e., the fine FOE 101 in FIG. 4. It can be observed that the range of the fine FOE 101 is quite narrow, [−1 GHz, 1 GHz], whereas the cascaded FOE has a comparatively much larger range. When the frequency offset goes beyond an FOE's range, the Q-factor penalty rises dramatically, representing the loss of lock between the transmitting laser and the LO. Note that the step size of the frequency offset is 1 GHz and the theoretical range of the fine FOE should be [−1.34 GHz, 1.34 GHz].

In contrast, the cascaded FOEs can largely increase the FOE range up to [−0.9$R_s$, 0.9$R_s$]. This is due to the fact that the coarse FOE can provide a rough estimate of the exact frequency offset ($\Delta f$) such that the fine FOE can easily and accurately track the residual frequency offset. The two-step approach allows for accurate offset compensation over a very wide range. The Q-factor penalty increases with the frequency offset due to the fixed bandwidth of $5^{th}$-order Bessel low pass filters (0.75$R_s$). To illustrate this phenomenon, the performance when ideal frequency offset is compensated for in the system is also shown. As depicted in FIG. 5, the performance of the cascaded FOE has nearly the same performance as the FOE using ideal frequency offset compensation. In general, the cascaded FOE is confirmed to be effective and wide-range, and its performance can be as good as the ideal frequency offset compensation within its extended operating range.

Figure 6:
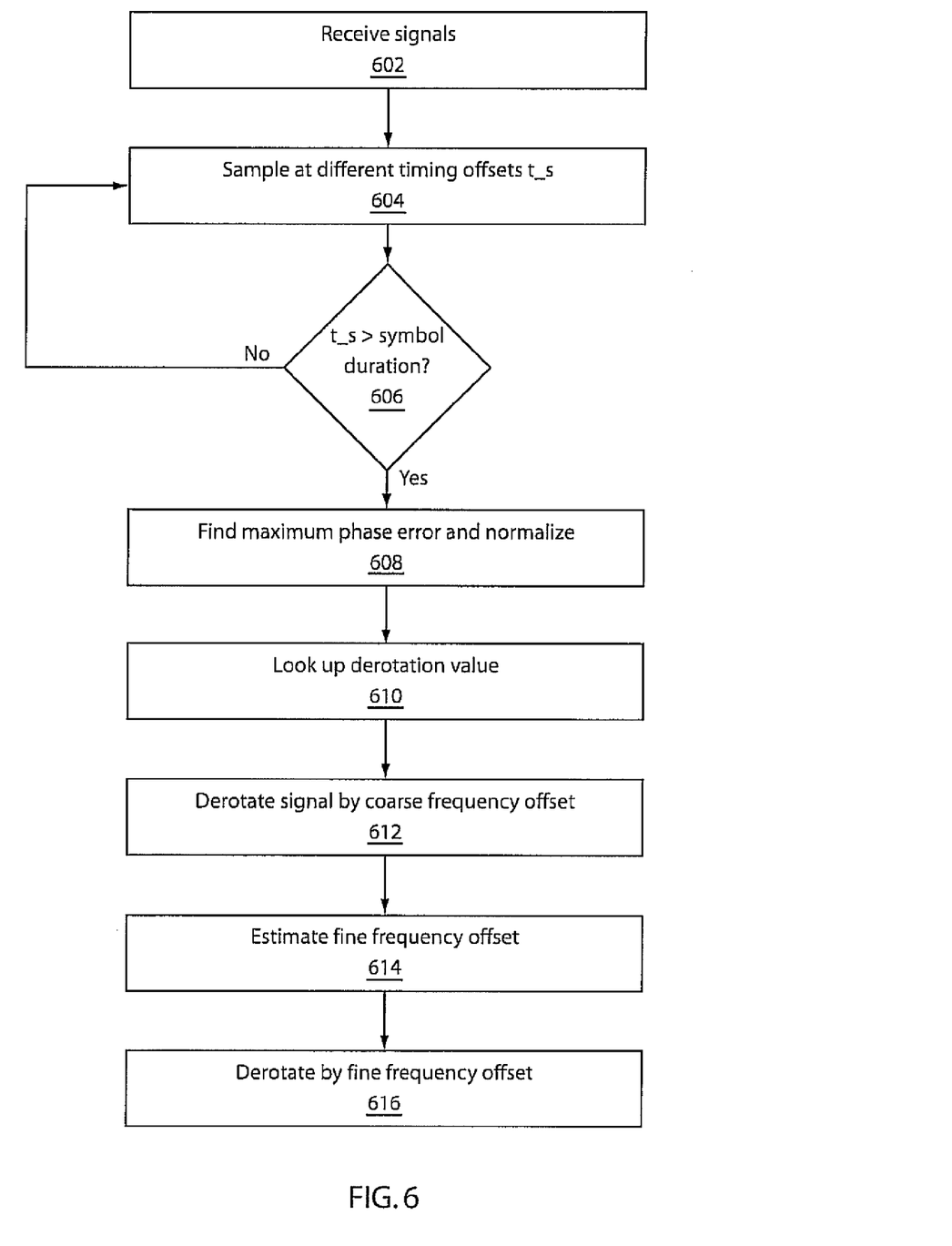
FIG. 6 is a block/flow diagram showing a system/method for frequency offset estimation according to the present principles.

Referring now to FIG. 6, a block/flow diagram illustrates a system/method for cascaded FOE. Block 602 receives incoming signals, which block 604 samples at varying timing offsets $t_s$. If $t_s$ is greater than the symbol duration, processing proceeds to block 606. Otherwise processing returns to block 604 and a new timing offset is chosen. At block 608, the MPE is found and normalized using the Gardner formulation. Block 610 uses the MPE to look up a derotation value for uses in coarse FOE. Block 612 then derotates the signal by a coarse frequency offset, leaving residual frequency offset. Block 614 estimates the residual frequency offset and produces a fine frequency offset derotation value. Block 616 derotates the signal by the fine frequency offset value to remove the residual frequency offset, thereby producing a fully frequency-compensated output signal. By performing the cascaded FOE steps, a much wider range of frequency offsets can be compensated for than was available previously.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for receiving an optical signal, including:
   coherently detecting an optical signal, including:
      compensating for a first laser frequency offset between a transmitting laser and a local oscillator laser by determining a maximum phase error (MPE) in the optical signal; and compensating for a residual laser frequency offset between the transmitting laser and the local oscillator laser; and decoding data stored in the optical signal.

2. The method of claim 1, wherein said compensating for the first laser frequency offset includes:
   determining the MPE in the optical signal;
   converting the MPE to a coarse derotation value; and
   derotating the signal using the coarse derotation value.

3. The method of claim 2, wherein said converting includes using a lookup table to find the coarse derotation value that corresponds to the maximum phase error.

4. The method of claim 2, wherein determining an MPE in the optical signal includes:
   sampling the optical signal at twice a symbol rate to produce an inphase and quadrature signal;
   finding a phase error U(k) of the inphase and quadrature signals across a plurality of timing offsets as $$U_t(2k)=I_x(2k-1)[I_x(2k)-I_x(2k-2)]+Q_x(2k-1)[Q_x(2k)-Q_x(2k-2)],$$

where 2k is a particular sample, $I_x(n)$ is a particular sample of the inphase signal and $Q_x(n)$ is a particular sample of the quadrature signal; and
   determining which timing offset produces the maximum phase error.

5. The method of claim 1, wherein said compensating for a fine laser frequency offset includes:
   determining a fine derotation value; and
   derotating the optical signal using the fine derotation value.

6. The method of claim 5, wherein the fine derotation value is determined using a fast-fourier transform (FFT)-based approach.

7. The method of claim 6, wherein the fine derotation value is determined using an Mth power approach.

8. The method of claim 1, wherein said compensating for the first laser frequency offset can accommodate a frequency offset range of at least ±0.9 times a symbol rate of the optical signal.

9. The method of claim 1, wherein said compensating for a fine laser frequency offset can accommodate a frequency offset range of at least $[-R_s/2M, R_s/2M]$, where M is a modulation order and $R_s$ is a symbol rate.

10. A receiver, including:
    a digital signal processor configured to detect an optical signal, including:
       a coarse frequency offset estimator (FOE) configured to compensate for a first laser frequency offset between a transmitting laser and a local oscillator laser by determining a maximum phase error (MPE) in the optical signal; and
       a fine FOE configured to compensate for a residual laser frequency offset between the transmitting laser and the local oscillator laser; and
    a digital signal processor configured to decode data stored in the optical signal.

11. The receiver of claim 10, wherein said coarse FOE includes:
    an MPE sweeper configured to determine a maximum phase error in the optical signal;
    a lookup table configured to convert the maximum phase error to a coarse derotation value; and
    a rotator configured to derotate the optical signal using the coarse derotation value.

12. The receiver of claim 11, wherein the MPE sweeper is configured to sample the optical signal at twice a symbol rate to produce an inphase and quadrature signal, find a phase error U(k) of the inphase and quadrature signals across a plurality of timing offsets as $$U_t(2k)=I_x(2k-1)[I_x(2k)-I_x(2k-2)]+Q_x(2k-1)[Q_x(2k)-Q_x(2k-2)],$$

where 2k is a particular sample, $I_x(n)$ is a particular sample of the inphase signal and $Q_x(n)$ is a particular sample of the quadrature signal, and determine which timing offset produces the maximum phase error.

13. The receiver of claim 10, wherein said fine FOE is configured to determine a fine derotation value and derotate the optical signal using the fine derotation value.

14. The receiver of claim 13, wherein the fine FOE is configured to determine the fine derotation value using a fast-fourier transform (FFT)-based approach.

15. The method of claim 14, wherein the fine FOE is configured to determine the fine derotation value using an Mth power approach.

16. The receiver of claim 10, wherein said coarse FOE is configured to accommodate a frequency offset range of at least ±0.9 times a symbol rate of the optical signal.

17. The receiver of claim 10, wherein said fine FOE is configured to accommodate a frequency offset range of at least $[-R_s/2M, R_s/2M]$, where M is a modulation order and $R_s$ is a symbol rate.

18. The receiver of claim 10, wherein the coarse FOE and the fine FOE comprise a cascaded FOE configured to provide wide-range frequency offset estimation.

19. A method for receiving an optical signal, including:
    coherently detecting an optical signal, including:
       compensating for a first laser frequency offset between a transmitting laser and a local oscillator laser by:
          determining a maximum phase error (MPE) in the optical signal by sweeping a timing offset;
          converting the MPE to a coarse derotation value by comparing the MPE to a lookup table; and
          derotating the signal using the coarse derotation value; and
       compensating for a residual laser frequency offset between the transmitting laser and the local oscillator laser by:
          determining a fine derotation value; and
          derotating the optical signal using the fine derotation value; and
    decoding data stored in the optical signal.

20. The method of claim 19, wherein determining an MPE in the optical signal includes:
    sampling the optical signal at twice a symbol rate to produce an inphase and quadrature signal;
    finding a phase error U(k) of the inphase and quadrature signals across a plurality of timing offsets as $$U_t(2k)=I_x(2k-1)[I_x(2k)-I_x(2k-2)]+Q_x(2k-1)[Q_x(2k)-Q_x(2k-2)],$$

where 2k is a particular sample, $I_x(n)$ is a particular sample of the inphase signal and $Q_x(n)$ is a particular sample of the quadrature signal; and
    determining which timing offset produces the maximum phase error.

* * * * *